United States Patent
Lin

(10) Patent No.: US 10,324,288 B2
(45) Date of Patent: Jun. 18, 2019

(54) VEHICLE DISPLAY SYSTEM ABSORBING AMBIENT LIGHT

(71) Applicant: Mega 1 Company Limited, New Taipei (TW)

(72) Inventor: Wei-Chih Lin, New Taipei (TW)

(73) Assignee: Mega 1 Company Limited, New Taipei (TW)

( * ) Notice: Subject to any disclaimer, the term of this patent is extended or adjusted under 35 U.S.C. 154(b) by 0 days.

(21) Appl. No.: 15/813,261

(22) Filed: Nov. 15, 2017

(65) Prior Publication Data

US 2018/0143351 A1 May 24, 2018

(30) Foreign Application Priority Data

Nov. 21, 2016 (TW) .............................. 105217723 U

(51) Int. Cl.
*G02B 27/01* (2006.01)
*G02B 1/11* (2015.01)
(Continued)

(52) U.S. Cl.
CPC .......... *G02B 27/0101* (2013.01); *B60K 35/00* (2013.01); *G02B 1/10* (2013.01);
(Continued)

(58) Field of Classification Search
CPC ...... B60K 2350/2052; B60K 2350/352; B60K 37/02; G02B 2027/012; G02B 2027/0196; G02B 27/0101; G02B 27/141; G02B 27/18; G02B 27/283; G02B 2027/0118; G02B 2027/0121; G02B 27/0018
See application file for complete search history.

(56) References Cited

U.S. PATENT DOCUMENTS 4,919,517 A * 4/1990 Jost .................... G02B 27/0101
359/630
5,535,056 A * 7/1996 Caskey .................. B60R 1/082
204/192.26
(Continued)

*Primary Examiner* — Bao-Luan Q Le
(74) *Attorney, Agent, or Firm* — Alan D. Kamrath; Karin W. Williams; Mayer & Williams PC

(57) ABSTRACT

An anti-glare head-up display system for vehicles includes a projection imaging unit and a curved mirror. The projection imaging unit is in an upper region of a cabin of the vehicle. The curved mirror is on a top surface of an instrument panel of the vehicle. The curved mirror includes a doped glass, a high-reflection coating and a dark coating. The doped glass and the dark coating absorb visible light. The high-reflection coating is on a surface of the doped glass facing the projection imaging unit and has a high-reflection effect at wavelengths corresponding to light sources used by the projection imaging unit. The dark coating is on another surface of the doped glass opposite with the projection imaging unit. Light rays emitted by the projection imaging unit are projected onto the curved mirror, and light rays reflected from the curved mirror are projected onto the windshield to form a virtual image in front of the windshield. Light rays of ambient light projected onto the curved mirror which do not belong to the wavelengths corresponding to the light sources pass through the high-reflection coating and are absorbed by the doped glass and the dark coating.

7 Claims, 4 Drawing Sheets

(51) Int. Cl.
  *G02B 1/10* (2015.01)
  *G02B 5/20* (2006.01)
  *G02B 27/00* (2006.01)
  *B60K 35/00* (2006.01)

(52) U.S. Cl.
  CPC ............. *G02B 1/11* (2013.01); *G02B 5/20* (2013.01); *G02B 27/0018* (2013.01); *G02B 27/0179* (2013.01); *B60R 2300/205* (2013.01); *G02B 2027/012* (2013.01); *G02B 2027/0118* (2013.01); *G02B 2027/0121* (2013.01); *G02B 2027/0154* (2013.01)

(56) References Cited

U.S. PATENT DOCUMENTS

| | | | | |
|---|---|---|---|---|
| 5,576,885 A * | 11/1996 | Lowe | .................. | C03C 17/3411 219/219 |
| 5,751,489 A * | 5/1998 | Caskey | .................. | B60R 1/082 359/584 |
| 6,065,840 A * | 5/2000 | Caskey | .................. | B60R 1/082 359/584 |
| 6,196,688 B1 * | 3/2001 | Caskey | .................. | B60R 1/082 359/603 |
| 6,286,965 B1 * | 9/2001 | Caskey | .................. | B60R 1/082 359/584 |
| 6,791,511 B2 * | 9/2004 | Eschler | .............. | G02B 27/0101 345/7 |
| 7,275,831 B2 * | 10/2007 | Knoll | .................. | B60R 1/00 345/7 |
| 7,371,143 B2 * | 5/2008 | Becken | .................. | C03C 27/06 445/25 |
| 8,721,084 B2 * | 5/2014 | Mori | .................. | G03B 21/00 353/13 |
| 9,423,615 B2 * | 8/2016 | Sato | .................. | G09G 3/3406 |
| 10,061,187 B2 * | 8/2018 | Ichihashi | .............. | G02B 5/0808 |
| 2002/0167498 A1 * | 11/2002 | Eschler | .............. | G02B 27/0101 345/204 |
| 2003/0020880 A1 * | 1/2003 | Knoll | .................. | B60R 1/00 353/13 |
| 2006/0082298 A1 * | 4/2006 | Becken | .................. | C03C 27/06 313/512 |
| 2006/0084348 A1 * | 4/2006 | Becken | .................. | C03C 27/06 445/25 |
| 2007/0223096 A1 * | 9/2007 | O'Connor | ................ | G02B 5/10 359/584 |
| 2008/0182062 A1 * | 7/2008 | Becken | .................. | C03C 27/06 428/68 |
| 2008/0297727 A1 * | 12/2008 | Mori | .................. | G03B 21/00 353/13 |
| 2010/0027144 A1 * | 2/2010 | Varaprasad | .............. | C03C 17/42 359/870 |
| 2015/0098029 A1 * | 4/2015 | Sato | .................. | G09G 3/3406 349/11 |
| 2016/0357096 A1 * | 12/2016 | Ichihashi | .............. | G02B 5/0808 |
| 2017/0139206 A1 * | 5/2017 | Sugikawa | .......... | G02B 27/0101 |

* cited by examiner

VEHICLE DISPLAY SYSTEM ABSORBING AMBIENT LIGHT

FIELD OF THE INVENTION

The present invention relates to a head-up display system for vehicles and, more particularly, to an anti-glare head-up display system.

BACKGROUND OF THE INVENTION

A conventional head-up display system for vehicles includes a projection imaging unit and a curved mirror. The projection imaging unit is disposed in an upper region of a cabin of the vehicle. The curved mirror is disposed on a top surface of an instrument panel of the vehicle. Light rays emitted by the projection imaging unit are projected onto the curved mirror. Light rays reflected from the curved mirror are projected onto a windshield of the vehicle above the instrument panel to form a virtual image in front of the windshield. The virtual image is formed within a line of sight of a driver. While the driver pays attention to traffic, the driver can acquire information of driving from the virtual image at the same time. However, ambient light (e.g., sun light) may be projected on the curved mirror and then be reflected to the windshield, which causes glare to the driver.

SUMMARY OF THE INVENTION

Embodiments of the present invention disclose an anti-glare head-up display system for vehicles. The vehicle includes a cabin, an instrument panel in the front of the cabin, and a windshield above the instrument panel. The anti-glare head-up display system includes a projection imaging unit and a curved mirror. The projection imaging unit is disposed in an upper region of the cabin. The curved mirror is disposed on a top surface of the instrument panel. The curved mirror includes a doped glass, a high-reflection coating and a dark coating. The doped glass absorbs visible light. The high-reflection coating is arranged on a surface of the doped glass facing the projection imaging unit. The high-reflection coating has a high-reflection effect at wavelengths corresponding to a plurality of light sources used by the projection imaging unit. The dark coating is arranged on another surface of the doped glass opposite with the projection imaging unit. The dark coating absorbs visible light. Light rays emitted by the projection imaging unit are projected onto the curved mirror, and light rays reflected from the curved mirror are projected onto the windshield to form a virtual image in front of the windshield. Light rays of ambient light projected onto the curved mirror which do not belong to the wavelengths corresponding to the plurality of light sources pass through the high-reflection coating and are absorbed by the doped glass and the dark coating.

The features of the present invention will no doubt become understandable to those of ordinary skill in the art after reading the following detailed description of the preferred embodiments that are illustrated in the various figures and drawings.

DETAILED DESCRIPTION OF ILLUSTRATIVE EMBODIMENTS

Figure 1:
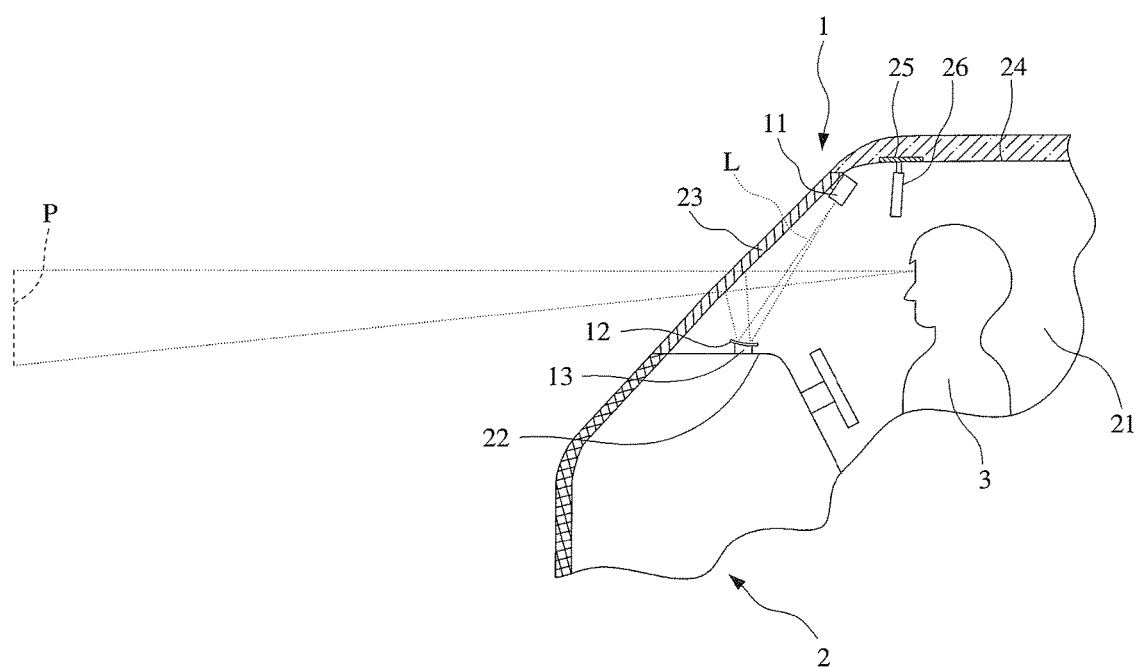
FIG. 1 illustrates a perspective view of an anti-glare head-up display system according to an embodiment of the present invention.

In the following embodiments, common reference numerals are used to indicate the same or similar components. In addition, spatial descriptions in the following embodiments, such as "above," "below," "up," "left," "right," "down," "top," "bottom," "front," "rear," "back," and so forth, are merely for the orientation of the component(s) as shown in the associated figure. Therefore, the spatial descriptions used herein are for purposes of illustration only but not for limiting the present invention.

Please refer to FIG. 1. FIG. 1 illustrates a perspective view of an anti-glare head-up display system 1 according to an embodiment of the present invention. The anti-glare head-up display system 1 is utilized for a vehicle 2. The vehicle 2 includes a cabin 21, an instrument panel 22 in the front of the cabin 21, a windshield 23 above the instrument panel 22, an internal roof 24 in a top side of the cabin 21, and a sun visor 25 and a review mirror 26 disposed on the internal roof 24. The anti-glare head-up display system 1 includes a projection imaging unit 11, a curved mirror 12, and an adjustment mechanism 13.

Figure 2:
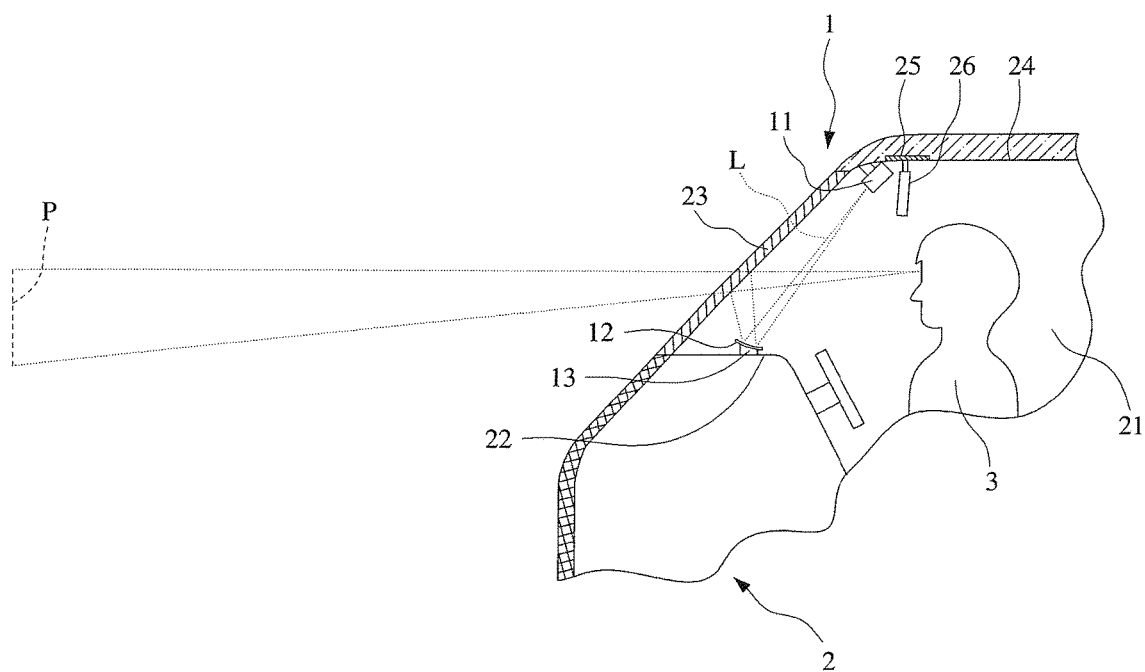
FIG. 2 illustrates a perspective view of an anti-glare head-up display system according to another embodiment of the present invention.

The projection imaging unit 11 is disposed in a top side of the cabin 21. In the embodiment, the projection imaging unit 11 is disposed on a top region of the windshield 23. For example, the projection imaging unit 11 is disposed on the top region and includes 10% of an area of the windshield. In another embodiment, as shown in FIG. 2, the projection imaging unit 11 is instead disposed on a front region of the internal roof 24. For example, the projection imaging unit 11 is disposed on the sun visor 25 or is disposed on a front region of the review mirror 26.

Figure 3:
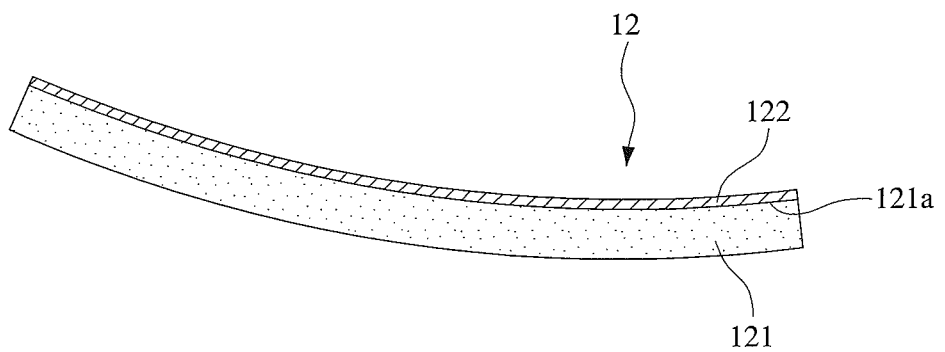
FIG. 3 illustrates a perspective view of a curved mirror according to an embodiment of the present invention.
Figure 4:
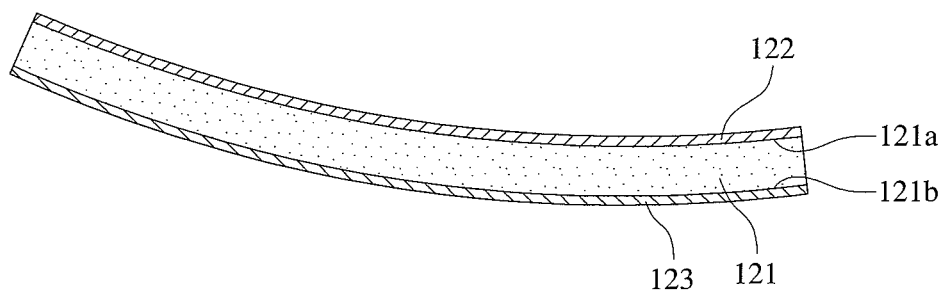
FIG. 4 illustrates a perspective view of a curved mirror according to another embodiment of the present invention.

The curved mirror 12 is disposed on a top surface of the instrument panel 22. Please refer to FIG. 3. FIG. 3 illustrates a perspective view of the curved mirror 12 according to an embodiment of the present invention. The curved mirror 12 includes a doped glass 121 and a high-reflection coating 122. The high-reflection coating 122 is arranged on a surface 121a of the doped glass 121 facing the projection imaging unit 11. Based upon different choices of doped materials of the doped glass 121, the doped glass would include a color of brown, grey, or black. As a result, the doped glass 121 can absorb visible light. The high-reflection coating 122 has a high-reflection effect at wavelengths corresponding to a plurality of light sources used by the projection imaging unit 11. For example, if the projection imaging unit 11 adopts a red light source with wavelengths of 630-650 nm, a green light source with wavelengths of 510-530 nm, and a blue light source with wavelengths of 440-460 nm to form a composite image, the high-reflection coating 122 accordingly adopts a coating having high-reflection effect at wavelengths of 630-650 nm, 510-530 nm, and 440-460 nm. In another embodiment, as shown in FIG. 4, the curved mirror 12 further includes a dark coating 123. The dark coating 123 is arranged on another surface 121b of the doped glass 121 opposite with the projection imaging unit 11. The dark coating 123 may be, for example, a baking varnish, which includes a color of brown, grey, or black. As a result, the dark coating 123 can absorb visible light.

The adjustment mechanism 13 is disposed on the top surface of the instrument panel 22. The adjustment mechanism 13 provides the curved mirror 12 with a capability of adjustment to a forward-backward position and an inclined angle relative to at least one direction.

Light rays L emitted by the projection imaging unit 11 are projected onto the curved mirror 12, and light rays reflected from the curved mirror 12 are projected onto the windshield 23 to form a virtual image P in front of the windshield 23. The virtual image P is formed within a line of sight of a driver 3. While the driver 3 pays attention to traffic, the driver 3 can acquire information of driving from the virtual image P at the same time.

Since the high-reflection coating 122 of the curved mirror 12 has a high-reflection effect at wavelengths corresponding to the light sources used by the projection imaging unit 11, most of the light rays L emitted by the projection imaging unit 11 would be reflected by the curved mirror 12 to the windshield 23, which can form a clearer image. In addition, most of light rays of ambient light (e.g., sun light) projected on the curved mirror 12 would pass through the high-reflection coating 122 and be absorbed by the doped glass 121 and/or the dark coating 123. Therefore, interference of glare caused by ambient light can be significantly reduced.

While the present invention has been described by way of example and in terms of the preferred embodiments, it is to be understood that the present invention needs not be limited to the disclosed embodiments. For anyone skilled in the art, various modifications and improvements within the spirit of the present invention are covered under the scope of the present invention. The covered scope of the present invention is based on the appended claims.

What is claimed is:

1. An anti-glare head-up display system for a vehicle, with the vehicle comprising a cabin, an instrument panel in a front of the cabin, and a windshield above the instrument panel, with the anti-glare head-up display system comprising:
    a projection imaging unit disposed in a top side of the cabin, wherein light sources used by the projection imaging unit comprises red light sources, green light sources, and blue light sources; and
    a curved mirror disposed on a top surface of the instrument panel, with the curved mirror comprising:
        a doped glass absorbing visible light, wherein the doped glass comprises a color of brown, grey, or black;
        a high-reflection coating arranged on a surface of the doped glass facing the projection imaging unit, wherein the high-reflection coating has a high-reflection effect at wavelengths of red light, green light, and blue light of the red, green and blue light sources used by the projection imaging unit; and
        a dark coating arranged on another surface of the doped glass opposite with the projection imaging unit, with the dark coating absorbing visible light;
    wherein the red, green and blue light emitted by the projection imaging unit is projected onto the curved mirror, is reflected from the curved mirror, and is projected onto the windshield to form a virtual image in front of the windshield; and
    wherein light rays of ambient light projected onto the curved mirror which do not belong to the wavelengths corresponding to the red, green and blue light pass through the high-reflection coating and are absorbed by the doped glass and the dark coating.

2. The anti-glare head-up display system of claim 1, further comprising:
    an adjustment mechanism disposed on the top surface of the instrument panel, wherein the adjustment mechanism adjusts the curved mirror to a forward-backward position and an inclined angle relative to at least one direction.

3. The anti-glare head-up display system of claim 1, wherein the projection imaging unit is disposed on a top region of the windshield.

4. The anti-glare head-up display system of claim 3, wherein the projection imaging unit is disposed on the top region and includes 10% of an area of the windshield.

5. The anti-glare head-up display system of claim 1, wherein the projection imaging unit is disposed on a front region of the internal roof of the vehicle.

6. The anti-glare head-up display system of claim 5, wherein the projection imaging unit is disposed on a sun visor or is disposed on a front region of a review mirror.

7. The anti-glare head-up display system of claim 1, wherein the dark coating comprises a color of brown, grey, or black.

* * * * *